United States Patent [19]

Bayer

[11] 3,816,364

[45] June 11, 1974

[54] EPOXY BASE INK COMPOSITION

[76] Inventor: John W. Bayer, Toledo, Ohio

[73] Assignee: Owens-Illinois, Inc., Toledo, Ohio

[22] Filed: June 1, 1972

[21] Appl. No.: 258,739

Related U.S. Application Data

[63] Continuation-in-part of Ser. No. 780,289, Nov. 29, 1968, which is a continuation of Ser. No. 297,671, July 25, 1963, which is a continuation of Ser. No. 120,499, June 29, 1961, abandoned.

[52] U.S. Cl.................... 260/18 EP, 260/29.1 SB, 260/32.8 EP, 260/37 EP, 260/830 TW
[51] Int. Cl....................... C08g 51/72, C08g 51/04
[58] Field of Search.................. 260/37 EP, 830

[56] References Cited
UNITED STATES PATENTS
2,832,754   4/1958   Jex et al........................ 260/46.5 E
2,904,447   9/1959   Hochuli et al........................ 117/38

FOREIGN PATENTS OR APPLICATIONS
736,641   9/1955   Great Britain..................... 260/830

Primary Examiner—Lewis T. Jacobs
Attorney, Agent, or Firm—Donald Keith Wedding; E. J. Holler

[57]    ABSTRACT

There is disclosed a pigmented or non-pigmented, epoxy resin base, thixotropic, decorative ink composition having a printable viscosity and comprising a mixture of liquid and solid linear glycidyl epoxy resins derived from dihydric phenols, the weight ratio of liquid epoxy resin to solid epoxy resin ranging from about 7:1 to less than about 9:1, said ink exhibiting, when cured, a glossy, opaque finish having good permanency of adhesion.

10 Claims, No Drawings

EPOXY BASE INK COMPOSITION

RELATED CASES

This invention is a continuation-in-part of copending U.S. application Ser. No. 780,289 now abandoned, filed Nov. 29, 1968, which is a continuation-in-part of U.S. application Ser. No. 297,671, filed July 25, 1963, now abandoned, which is a continuation-in-part of U.S. application Ser. No. 120,499, filed June 29, 1961, now abandoned.

THE DISCLOSURE

This invention relates to epoxy resin composition. More particularly, this invention relates to non-pigmented or pigmented, epoxy resin based ink compositions useful as decorative and/or protective coatings.

Paints and inks which contain linear epoxy resins are known in the coating and decorating art. When a solid linear epoxy resin is used, a large amount of an inert solvent or diluent is necessary to dissolve the resin. Typical solvents and diluents are low molecular weight hydrocarbons, alcohols, polyethers, and ketones such as toluene, zylene, n-butanol, methylisobutyl-carbinol, methyl cellosolve, butyl cellosolve, acetone, methyl ethyl ketone, and methyl isobutyl ketone.

A liquid linear epoxy resin can replace the solution of a solid linear epoxy resin in decorative processes such as silk screening. Thus, typically a liquid linear epoxy resin or a solution of a solid linear epoxy resin together with a pigment and other coating additives, is stencilled through the screen onto the surface of the article to be decorated. The resin-based coating is then cured by means of heat, catalysts, or crosslinking agents to give a thermoset, glossy, homopolymerized or heteropolymerized resin which contains the dispersed pigment.

It has been found, however, that neither a liquid linear epoxy resin nor a solution of a solid linear epoxy resin is entirely satisfactory for a pigment base in decorating by the letterpress or the dry offset process. In the letterpress method, the decorating material is passed on a series of rollers to a drum on which the print or other pattern is present as a raised surface; this surface is coated with the ink, and then contacted with the surface to be decorated. Dry offset printing is similar, except that the print or pattern image is transferred from the drum to a rubber blanket, which is then contacted with the piece to be decorated. The offset procedure has the advantage that less uniform surfaces can be coated. When either the letterpress or offset process is carried out using an ink which has a liquid linear epoxy resin base, the final cured product has a coating which is much less glossy and less scratch resistant than the same coating applied by a silk screen method.

When a solution of a solid linear epoxy resin in an inert solvent is used in the letterpress or offset process, evaporation of the solvent occurs on the rollers, and often only partial printing occurs. It has now been discovered that certain mixtures of liquid and solid linear epoxy resins derived from dihydric phenols in admixture with a relatively low amount of inert volatile solvent or diluent of the type already described are excellent decorative or protective coatings for glass surfaces. These compositions in admixture with a coloring agent and optionally other ink components also provide excellent inks, particularly for use in letterpress and dry offset procedures.

Thus, in accordance with this invention there is provided a pigmented or non-pigmented decorative or protective coating composition containing an optimum weight ratio of liquid epoxy resins to solid epoxy resins and a relatively low amount of inert volatile solvent such that the composition is particularly useful in letterpress and dry offset printing methods. Likewise, the composition exhibits, when cured, a glossy, opaque finish having good permanency of adhesion.

More particularly, there is provided a pigmented or non-pigmented, epoxy resin base, thixotropic, decorative ink composition having a printable viscosity and comprising a mixture of liquid and solid linear glycidyl epoxy resins derived from dihydric phenols, the weight ratio of liquid epoxy resin to solid epoxy resin ranging from about 7:1 to less than about 9:1 and a low amount of volatile solvent or diluent, e.g., about 0 to 8 percent by weight.

In a preferred practice hereof, the weight ratio of liquid epoxy to solid epoxy ranged from about 7.25:1 to about 8.25:1.

An epoxy resin can be defined as a mixture of molecules, a majority of which contain more than one epoxide group; the resin molecules are usually formed by condensation of an epoxide-containing species with a precursor which contains two or more hydroxyl groups. A large variety of cyclic and acyclic epoxides and many aliphatic and aromatic polyhydroxy compounds have been used in the preparation of epoxy resins, but for purposes of this invention, attention can be limited to those epoxides resulting from the condensation of epichlorohydrin

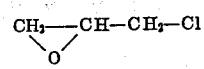

with a dihydric phenol, represented as HO—Z—OH.

The condensation of epichlorohydrin with a dihydric phenol is commonly carried out in the presence of a slight stoichiometric excess of base at elevated temperatures. If a molar ratio of epichlorohydrin:dihydric phenol of about 10:1 is used, the reaction is essentially a Williamson ether synthesis:

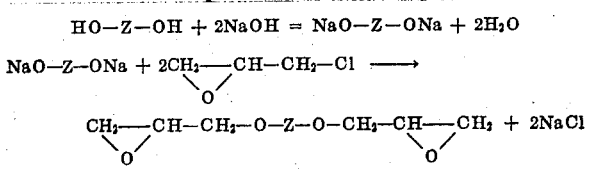

The product contains two glycidyl

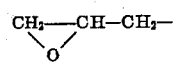

epoxide functions. If increasing quantities of the phenol are employed while the quantity of epichlorohydrin is held constant, the products are linear polymers of the general formula

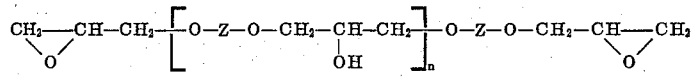

in which n has the integral values 1, 2, 3, etc.; these linear condensation products are generally liquids whose viscosities vary directly with their molecular weights. High molecular weight linear polymers which increasingly acquire the characteristics of solids are prepared by reacting low molecular weight polymers with an excess of a dihydric phenol at temperatures approaching 200°C. These compounds have formulas of the type just shown in which n has high integral values. The liquid and solid linear epoxy resins are thermoplastic, i.e., their viscosity decreases when they are heated.

Linear epoxy resins are characterized by their molecular weight, viscosity, epoxide equivalent weight, and, if solid, their melting point. Molecular weight is measured by an ebullisocopic means in which ethylene dichloride is the solvent; viscosity is determined on the resin or its solution in a suitable hydroxypolyether, commonly by means of a Gardner-Holt apparatus. The epoxide equivalent weight is defined as that weight of resin which is equivalent to one epoxide group. A weighed sample of resin is allowed to react with a known quantity of pyridinium chloride, and the excess pyridinium chloride is back titrated with base. On the assumption that one molecule of the pyridine salt is decomposed by each epoxide group in the resin, the number of epoxide groups in the sample is calculated; division of the result by the weight of the resin sample taken gives the epoxide equivalent weight. When the molecular weight is known, the epoxy functionality, the number of epoxide groups per molecule, can also be calculated.

The melting point of linear epoxy resins is conveniently determined by the method described by T. H. Durrans at J. Oil and Colour Chem. Assoc. 12, 173 (1929).

The thermoplastic linear epoxy resins can be converted to thermoset cured resins by treatment with a catalyst, a cross-linking agent, or heat. Catalysts for curing are usually amines; they promote the reaction of the interior hydroxyl groups of a resin molecule with the epoxide groups in another molecule. Resins cured by a catalyst and/or heat are termed homopolymerized resins, since they provide their own crosslinkages. Copolymerization of the linear resin with a crosslinking agent, e.g., an organic acid anhydride, provides a heteropolymerized resin. Primary diamines can serve both as catalysts and as crosslinking agents. If the linear epoxy resin precursor contains epoxide rings which are separated by about three to 10 units, where each unit is an atom or an aromatic ring, the cured resin is highly crosslinked, rigid, and brittle. If the distance between epoxide groups in the precursor is about 10 to 30 units, the product is semi-rigid, and if it is more than about thirty units, the cured product is flexible and soft. Linear epoxy resins can also be formulated with a variety of plasticizers, flexibilizers, accelerators, stabilizers, flow control agents, pigments, and selected fillers to obtain particularly desired properties. Epoxy resins have found use as industrial castings, surface coatings, high-strength adhesives, durable laminates, cold solders, lightweight foams, potting compounds for electrical and electronic apparatus, and as bases in paints and inks.

As contemplated in the practice of this invention, the liquid and solid linear glycidyl epoxy resins (as referred to hereinbefore) are compounds of the formula

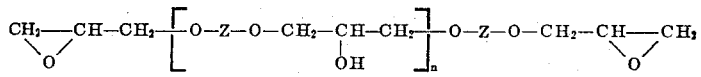

where $n$ represents an integer, and —O—Z—O— represents the ether residue of a dihydric phenol. The dihydric phenols of these compositions are compounds which contain only carbon, hydrogen and oxygen of the formula HO—Z—OH with molecular weights less than 400 amu (Atomic Mass Units) which contain two hydroxyl groups each of which is attached directly to an aromatic ring. Representative dihydric phenols are resorcinol, 2,4-dihydroxytoluene, 1,5-dihydroxynaphthalene, 4,4'-dihydroxybiphenyl, 4,4'-dihydroxy-2,2'-dimethylbiphenyl, 4,4'-dihydroxydiphenylmethane, 4,4'-dihydroxy-2,2'dimethyldiphenylmethane, 1,1-*bis*(4-hydroxyphenyl) ethane, 1,1-*bis*(4-hydroxy-2-methylphenyl)ethane, 2,2-*bis*(4-hydroxy-2-methylphenyl)ethane, 2,2-*bis*(4-hydroxyphenyl)propane, 2,2-*bis*(4-hydroxy-2-methylphenyl)propane, 2,2-*bis*(4-hydroxy-2-*t*-butylphenyl)propane, 2,2'-dihydroxydi(1-napthyl)methane, and their isomers and homologs within the definition above.

The term pigment as used herein includes both fillers and/or coloring agents including mixtures thereof. Although virtually all inorganic and organic pigments and dyes are applicable, zinc containing materials are usually avoided because they adversely affect the curing process. Likewise, alkaline and metallic pigments are usually avoided when acidic curing agents are used. Suitable pigments include organic and inorganic dyes and/or fillers such as titanium dioxide, zirconium dioxide, lead chromate, cadmium sulfide, calcium carbonate, phthalocyanine blue, phthalocyanine green, etc.

In a particular embodiment of this invention, there is provided an ink composition which comprises, in weight percentages, 40 to 60 percent of a base which is a mixture of liquid and solid linear glycidyl epoxy resins as previously defined, in a weight ratio of liquid resin: solid resin of from about 7:1 to less than about 9:1, wherein said epoxy resins plus a solid pigment or pigments comprise 70 to 100 percent of the ink composition and the composition contains less than 8 percent of an inert solvent or diluent. The term inert solvent or diluent refers to the types of compounds suitable for this purpose already described. In a further embodiment of this invention, there is provided an ink composition which comprises, in weight percentages, 40 to 60 percent of a base which is a mixture of liquid and solid linear glycidyl epoxy resins as previously defined, in a weight ratio of liquid resin:solid resin of from about 7:1 to less than about 9:1, and wherein said epoxy resins plus a solid pigment or pigments comprise 80 to 90 percent of the ink composition and the ink composition contains less than 8 percent of an inert solvent or diluent.

In a preferred embodiment of this invention, there is provided an ink composition which contains, in weight percentages, 40 to 60 percent of a base which is a mixture of liquid and solid linear glycidyl epoxy resins as previously defined in which the liquid resin has a viscosity in the range of about 20 to 200 poises at 25°C, and the solid resin has a melting point in the range of about 65° to 155°C, in a weight ratio of liquid resin: solid resin of from about 7:1 to less than about 9:1, and wherein 80 to 90 percent of said composition comprises said epoxy resin plus at least one solid pigment selected from the group which consists of titanium dioxide, zirconium dioxide, and lead chromate, and wherein said composition also comprises 0 to 2 percent of a curing agent for said epoxy resins; 0 to 2 percent of a flow agent; 0 to 2 percent of a wetting agent; and 0 to 8 percent of an inert solvent or diluent. A further preferred embodiment of this invention provides a coating composition which consists of a mixture of liquid and solid linear glycidyl epoxy resins as previously defined in which the liquid resin has a viscosity in the range of about 20 to 200 poises at 25°C, and the solid resin has a melting point in the range of about 65° to 155°C, in a weight ratio of liquid resin:solid resin of from about 7:1 to less than about 9:1.

The curing agents contemplated herein include any of the well known materials for this purpose including the cross-linking agents and catalyst types already described. In particular amine catalysts are effective, and primary diamines, which are both catalysts and cross-linking agents, are preferred. The catalyst must, of course, be soluble in the particular ink composition in which it is used. The flow agent referred to above is a liquid usually required in the ink formulation to prevent the printed image from crawling or forming discreet beads instead of continuous characters on curing. The particular flow agent to be used is best determined by routine test with each ink composition, but in general relatively low molecular weight silicones are preferred; silicone resins in which each silicon atom is attached to two methyl groups (referred to herein as dimethyl silicones) have been found to be generally useful. The wetting agent referred to is a substance which promotes wetting of the pigment particles by the resin base, thus promoting homogeneity of the ink. The wetting agent can be omitted if longer mixing times are used; for example, three or four passes on a three-roll mill when no wetting agent is used will usually provide about the same degree of homogeneity as one pass when a wetting agent is present. In general any surfactant which is compatible with the other ink components is a useful wetting agent. For the compositions of this invention, lecithins, mixed fatty acid esters of phosphatidyl choline, have been found generally suitable. The particular type and quantity of wetting agent is best determined by routine test.

In a particularly preferred embodiment of this invention, there is provided an ink composition which consists of, in weight percentages, 40 to 60 percent of a base which is a mixture of liquid and solid linear glycidyl epoxy resins as previously defined in which the liquid resin has a viscosity in the range of about 20 to 200 poises at 25°C, and the solid resin has a melting point in the range of about 65° to 155°C, in a weight ratio of liquid resin:solid resin of from about 7:1 to less than about 9:1, wherein said epoxy resins and at least one solid pigment selected from the group which consists of titanium dioxide, zirconium dioxide, and lead chromate comprise 80 to 90 percent of the ink composition, and wherein the composition also contains 0 to 2 percent curing agent for said epoxy resins; 0 to 2 percent of a dimethyl silicone flow agent; 0 to 2 percent of a licithin wetting agent; 0 to 8 percent of a volatile inert solvent or diluent; and *gamma*-aminopropyltriethoxysilane in

EXAMPLE 1 an amount sufficient to substantially increase the permanency of adherence of the ink to glass surfaces, e.g., about 1 to 3 percent.

These and other aspects and advantages of the present invention are further disclosed in the following illustrative examples.

A mixture of 70 parts (by weight) of a liquid linear glycidyl epoxy resin, 30 parts of a solid linear glycidyl epoxy resin, 2 parts of a dimethyl silicone flow agent, and 2 parts of a lecithin wetting agent was heated with stirring at about 65°C until the solid resin dissolved. The liquid and solid resins used were of the formula

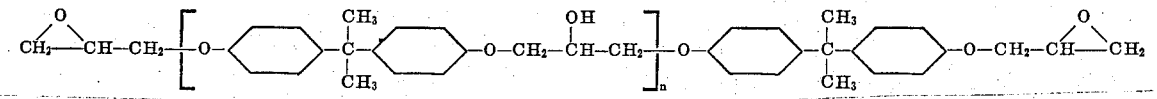

where *n* represents an integer. The liquid resin had a viscosity at 25°C of 40 to 100 poises, and an epoxide equivalent weight of 180 to 195; the solid resin had a melting point of 65° to 75°C and an epoxide equivalent weight of 425 to 550. The weight ratio of liquid resin:solid resin was 2.3:1. To the resultant mixture were added with stirring 95 parts of titanium dioxide (rutile) and 5 parts of zirconium dioxide. To 12.5 grams of the mixture thus obtained were added with stirring 1.87 grams of a 67 percent (by weight) solution of 4,4'-diaminodiphenylmethane in acetone and 0.30 gram of *gamma*-aminopropyltriethoxysilane. The resultant ink was printed onto a clean glass surface by means of an offset process; the coated glass was then heated at 204°C for ten minutes to effect cure. The surface of the cured coating was rough and lacked gloss. Thus this 2.3:1 ratio of liquid resin:solid resin was considered to be unsatisfactory.

EXAMPLE 2

By the procedure of Example 1, a mixture of 86.7 parts (by weight) of a liquid linear glycidyl epoxy resin, 13.3 parts of a solid linear glycidyl epoxy resin, 2 parts of a dimethyl silicone oil and 2 parts of a lecithin wetting agent was stirred until the solid resin dissolved. Thus the weight ratio of liquid resin:solid resin was 6.5:1. To the resultant mixture were added with stirring 95 parts of titanium dioxide (rutile) and 5 parts of calcium carbonate. To 100 grams of the resultant mixture were added 16.2 parts by weight of 4,4'-diaminodiphenyl methane, 24.9 parts by weight of acetone, and 12.3 parts by weight of gamma-aminopropyltriethoxy silane. The resultant ink was printed onto a clean glass surface by means of an offset process. The coated glass was heated at 216°C for 12 minutes to effect cure. The surface of the cured coating was rough and lacked gloss. Thus the 6.5:1 ration of liquid resin:solid resin was considered to be unsatisfactory.

EXAMPLE 3

By the procedure of Example 1, a mixture of 88 parts of liquid linear glycidyl epoxy resin, 12 parts of solid linear glycidyl epoxy resin, 2 parts of dimethyl silicone liquid flow agent, 2 parts of lecithin wetting agent, 96 parts of titanium dioxide, and 5 parts of zirconium dioxide was prepared. To 12.5 grams of the mixture thus obtained were added 2.20 grams of a 67 weight percent solution of 4,4'-diaminodiphenylmethane and 0.30 gram of *gamma*-aminopropyltriethoxysilane. The ink thus obtained was printed on a glass surface by means of a letterpress process, and the resultant coating was cured as described in Example 1. The resultant coating had a high gloss. The 7.3:1 weight ratio of liquid resin:-solid resin in this coating was thus considered to be satisfactory relative to the ratios used in Examples 1 and 2.

EXAMPLE 4

By the procedure of Example 1, a mixture of 88 parts of liquid linear glycidyl epoxy resin, 1 part of dimethyl silicone liquid flow agent, 1 part of lecithin wetting agent, 95 parts of titanium dioxide and 5 parts of zirconium dioxide was prepared. To 12.5 grams of the mixture thus obtained were added 2.20 grams of a 67 weight percent solution of 4,4'-diaminodiphenylmethane and 0.30 gram of *gamma*-aminopropyltriethoxysilane. The ink thus obtained was printed on a glass surface by means of a letterpress process, and the resultant coating was cured as described in Example 1. The resultant coating had a high gloss. The 7.3:1 weight ratio of liquid resin:solid resin was thus considered satisfactory relative to Examples 1 and 2.

EXAMPLE 5

By the procedure of Example 1, a mixture of 88 parts of liquid linear glycidyl epoxy resin, 12 parts of solid linear glycidyl epoxy resin, 2 parts of dimethyl silicone liquid flow agent, 2 parts of lecithin wetting agent, 95 parts of titanium dioxide, and 5 parts of calcium carbonate was prepared. To 12.5 grams of the mixture thus obtained were added 2.20 grams of a 67 weight percent solution of 4,4'-diaminodiphenylmethane and 0.30 gram of *gamma*-aminopropyltriethoxysilane. The ink thus obtained was printed on a glass surface by means of an offset process, and the resultant coating was cured as described in Example 1. The resultant coating had a high gloss. The 7.3:1 weight ratio of liquid resin:solid resin was thus considered to be satisfactory relative to Examples 1 and 2.

EXAMPLE 6

By the procedure of Example 1, a mixture of 88 parts of liquid linear glycidyl epoxy resin, 12 parts of solid linear glycidyl epoxy resin, 2 parts of dimethyl silicone liquid flow agent, 2 parts of lecithin wetting agent, 95 parts of lead chromate, and 5 parts of zirconium dioxide was prepared. To 12.5 grams of the mixture thus obtained were added 2.20 grams of a 67 weight percent solution of 4,4'-diaminodiphenylmethane and 0.30 gram of *gamma*-aminopropyltriethoxysilane. The yellow ink thus obtained was printed on a glass surface by means of a letterpress process, and the resultant coating was cured as described in Example 1. The resultant yellow coating had good opacity and gloss. The 7.3:1 weight ratio of liquid resin:solid resin was thus considered to be satisfactory relative to Examples 1 and 2.

EXAMPLE 7

Using the procedure of Example 1 and the ingredients of Examples 3, 4, 5 and 6, an 8.1:1 weight ratio of liquid to solid epoxy resin was used. The ink had a good printable viscosity and was thixotropic. After printing onto clean glass surfaces by means of an offset process, each coated glass was heated to a temperature sufficient to effect cure as described in Example 1. The surface of each cured coating had a high gloss. Thus the 8.1:1 weight ratio was considered to be satisfactory relative to the ratios used in Examples 1 and 2.

EXAMPLE 8

By the procedure of Example 1, a mixture of 90 parts of liquid linear glycidyl epoxy resin, 10 parts of solid linear glycidyl epoxy resin, 2 parts of dimethyl silicone liquid flow agent, 2 parts of lecithin wetting agent, 95 parts of titanium dioxide, and 5 parts of zirconium dioxide was prepared. To 12.5 grams of the mixture thus obtained were added 2.15 grams of a 67 weight percent solution of 4,4'-diaminodiphenylmethane in acetone and 0.30 gram of *gamma*-aminopropyltriethoxysilane. The ink thus obtained was slightly fluid but was printed on a glass surface by means of a letterpress. The resultant coating was cured as described in Example 1. The resultant coating had a good gloss. The 9:1 weight ratio of liquid resin:solid resin was thus considered to be satisfactory relative to Examples 1 and 2.

EXAMPLE 9

By the procedure of Example 1, a mixture of 100 parts of liquid linear glycidyl epoxy resin, 2.64 parts of dimethyl silicone liquid flow agent, 1.0 part of lecithin wetting agent, and 100 parts of titanium dioxide was prepared. To 12.5 grams of the mixture thus obtained were added 1.83 grams of a 67 weight percent solution of 4,4'-diaminodiphenylmethane in acetone and 0.24 gram of *gamma*-aminopropyltriethoxysilane. The ink thus obtained was printed on a glass surface by means of a letterpress process, and the resultant coating was cured as described in Example 1. The resultant cured coating had a very poor gloss and poor hardness. Thus this ink composition in which no solid linear glycidyl epoxy resin was used was considered unsatisfactory. This material could be used, however, in the silk screen process with good results.

Based on the results of Examples 1 to 9, the optimum weight ratio of liquid to solid epoxy resin (in accordance with this invention) is about 7:1 to less than about 9:1.

EXAMPLE 10

To further establish the liquid:solid epoxy weight ratio range, six printing ink batches were prepared with all ingredients being held constant. The only vairant was the weight ratio of liquid epoxy resin to solid epoxy resin. Both resins, including the other ingredients, were the same as used in the Examples 1 to 9. The ingredients for each batch are summarized in TABLE 1.

TABLE 1

| Batch No. | 1 | 2 | 3 | 4 | 5 | 6 |
|---|---|---|---|---|---|---|
| | (All ingredients are in grams) | | | | | |
| liquid epoxy | 87.0 | 87.5 | 89.5 | 90.0 | 91.1 | 95.0 |
| solid epoxy | 13.0 | 12.5 | 10.5 | 10.0 | 10.0 | 10.0 |
| dimethyl silicone | 2.0 | 2.0 | 2.0 | 2.0 | 2.0 | 2.0 |
| lecithin wetting agent | 2.0 | 2.0 | 2.0 | 2.0 | 2.0 | 2.0 |
| titanium oxide (rutile) | 95.0 | 95.0 | 95.0 | 95.0 | 95.0 | 99.8 |
| calcium carbonate | 5.0 | 5.0 | 5.0 | 5.0 | 5.0 | 5.2 |
| ratio of liquid to solid epoxy | 6.7:1 | 7.0:1 | 8.5:1 | 9.0:1 | 9.1:1 | 9.5:1 |

Each of the batch formulations one to six was passed four times through a three roll mill so as to blend the pigments in the binders.

Each blended batch was then stirred into a solution of 66.0 grams of p,p'-methylenedianiline, 33.0 grams of acetone, and 12.0 grams of gamma-aminopropyltriethoxysilane. A curing catalyst was added.

Each resulting printing ink batch composition was then applied to a flat glass slide substrate by means of an ink roller and heat cured at 400°F. for 12 minutes.

The results of each heat cured applied ink was as summarized in TABLE 2.

TABLE 2

| Printing Ink Batch Formulation | Results |
|---|---|
| 1 | Very tacky, mottled print, low gloss, pencil hardness 4H |
| 2 | Slight tack, smooth print, fair gloss, pencil hardness 5H |
| 3 | Good printing character, good film, good gloss |
| 4 | Roller starting to slip from low tack, excellent film, good gloss |
| 5 | Lubricious, slight mottled appearance, good gloss |
| 6 | Very lubricious, difficult to roll without roller slipping, mottled appearance fair gloss |

As will be evident to those skilled in the art, modifications of this invention can be made or followed in the light of the foregoing disclosure and discussion without departing from the spirit and scope of the disclosure or from the scope of the claims.

I claim:

1. As a composition of matter a pigmented or nonpigmented, epoxy resin base, thixotropic, decorative and/or protective coating ink having a printable viscosity and comprising a mixture of liquid and solid linear glycidyl epoxy resins derived from dihydric phenols, the weight ratio of liquid epoxy resin to solid epoxy resin ranging from 7:1 to less than 9:1, said composition exhibiting, when cured, a glossy, opaque finish.

2. The composition of claim 1 wherein the ink contains about 0 to about 8 weight percent volatile liquid diluents.

3. The composition of claim 2 wherein the ink contains about 40 to about 60 weight percent of liquid and solid epoxy resins and about 80 to about 90 weight percent of epoxy resins plus solid pigments.

4. The composition of claim 1 wherein the ink contains a small effective amount of gamma-aminopropyltriethoxy silane.

5. The composition of claim 1 wherein the epoxy resins are derived from dihydric phenol(s) having a molecular weight of less than 400 amu.

6. The composition of claim 5 wherein the dihydric phenol(s) is selected from resorcinol, 2,4-dihydroxytoluene, 1,5-dihydroxynaphthalene, 4,4'-dihydroxybiphenyl, 4,4'-dihydroxy-2,2'dimethylbiphenyl, 4,4'-dihydroxydiphenylmethane, 4,4'-dihydroxy-2,2'dimethyldiphenylmethane, 1,1-bis(4-hydroxyphenyl)ethane 1,1-bis(4-hydroxy-2-methylphenyl)ethane, 2,2-bis(4-hydroxyphenyl) propane, 2,2-bis(4-hydroxy-2-methylphenyl)propane, 2,2-bis(4-hydroxy-2-t-butylphenyl)propane, and 2,2'-dihydroxydi (1-napthyl)methane.

7. The composition of claim 3 wherein the liquid epoxy resin has a viscosity of about 20 to 200 poises at 25°C and the solid epoxy resin has a melting point of about 65°C to about 155°C.

8. The composition of claim 7 wherein the ink contains about 0 to about 2 percent by weight of a primary diamine curing agent for the epoxy resins, about 0 to about 2 percent by weight of a silicone flow agent and about 0 to about 2 percent by weight of lecithin wetting agent.

9. In a letterpress or offset printing process which comprises coating a surface with a decorative and/or protective ink, the improvement wherein the ink is thixotropic, has a printable viscosity, and comprises a mixture of liquid and solid linear glycidyl epoxy resins derived from dihydric phenols, the weight ratio of liquid epoxy resin to solid epoxy resin ranging from 7:1 to less than 9:1, such that said ink exhibits, when cured, a glossy, opaque finish.

10. The improvement of claim 2 wherein the weight ratio is about 7.25:1 to about 8.25:1.

* * * * *